United States Patent [19]

Fuller

[11] Patent Number: 5,725,288
[45] Date of Patent: Mar. 10, 1998

[54] ISOLATION VALVE FOR AN ANTILOCK BRAKE SYSTEM HAVING A CONTROLLED BYPASS

[75] Inventor: Edward Nelson Fuller, Manchester, Mich.

[73] Assignee: Kelsey-Hayes Company, Livonia, Mich.

[21] Appl. No.: 549,277

[22] Filed: Oct. 27, 1995

[51] Int. Cl.⁶ ............................................. B60T 8/36
[52] U.S. Cl. ........................... 303/119.2; 303/116.1; 303/119.1
[58] Field of Search ........................ 303/113.1, 119.1, 303/119.2, 116.1, 117; 364/426.01–426.02; 91/433; 137/596.16, 596.17

[56] References Cited

U.S. PATENT DOCUMENTS

| | | | |
|---|---|---|---|
| 3,731,980 | 5/1973 | Fink et al. | 303/116.1 |
| 4,892,362 | 1/1990 | Takata | 303/115 |
| 4,915,459 | 4/1990 | Hashida et al. | 303/119 |
| 4,964,680 | 10/1990 | Nokubo et al. | 303/115 |
| 5,018,797 | 5/1991 | Takata | 303/117 |
| 5,026,123 | 6/1991 | Nokubo et al. | 303/117 |
| 5,094,512 | 3/1992 | Kohno et al. | 303/117 |
| 5,242,216 | 9/1993 | Miyawaki et al. | 303/119.2 X |
| 5,364,067 | 11/1994 | Linkner, Jr. | 251/129.02 |
| 5,370,450 | 12/1994 | Volz et al. | 303/119.2 |

FOREIGN PATENT DOCUMENTS

| | | | |
|---|---|---|---|
| 4312414 | 10/1994 | Germany. | |
| 1132449 | 5/1989 | Japan | 303/119.2 |
| 1416645 | 12/1975 | United Kingdom | 303/119.2 |

*Primary Examiner*—Peter M. Poon
*Attorney, Agent, or Firm*—MacMillan, Sobanski & Todd

[57] ABSTRACT

An antilock braking system having a permanent reduced flow bypass passageway provided in parallel with the isolation valve to reduce the feedback to the brake pedal during an antilock mode of operation. In the preferred embodiment, the permanent fluid bypass passageway is provided internal to the isolation valve. The fluid bypass passageway connects the input fluid passageway to the output passageway in parallel with the valve member controlling the primary fluid flow through the isolation valve.

10 Claims, 3 Drawing Sheets

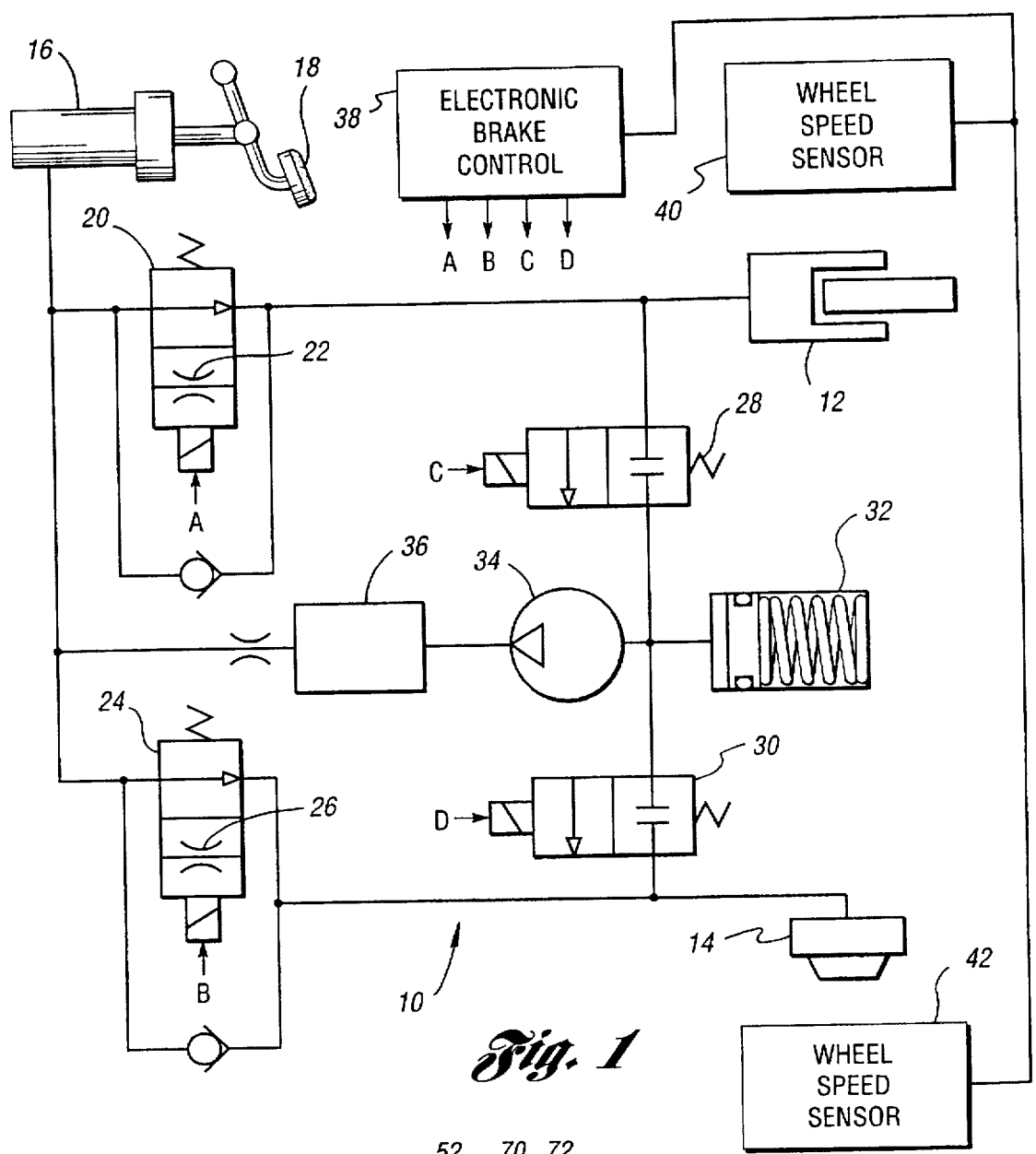
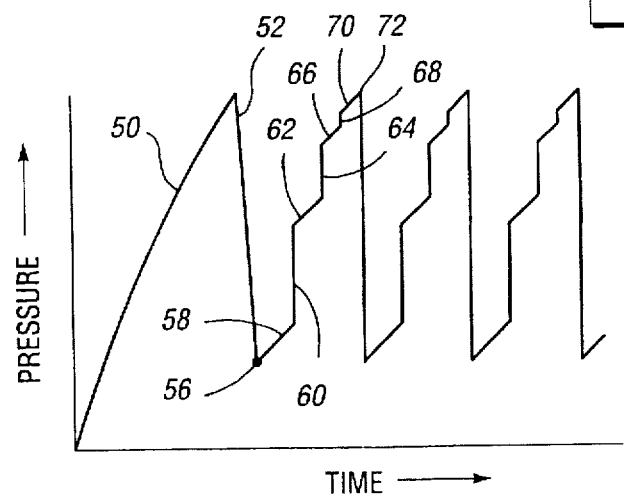

ISOLATION VALVE FOR AN ANTILOCK BRAKE SYSTEM HAVING A CONTROLLED BYPASS

TECHNICAL FIELD

The invention is related to antilocking brake systems and, in particular, to an isolation valve for an antilocking brake system having a controlled fluid bypass.

BACKGROUND ART

Antilock brake systems of the type taught by Linkner, Jr. in U.S. Pat. No. 5,364,067 embody normally open isolation valves disposed between the output of the master cylinder and the slave cylinder of the brake assembly. The normally open isolation valve is periodically closed by an electronic antilock control to prevent a further increase of the brake fluid pressure being applied to the slave cylinders of the brake assemblies once a lock-up condition of one or more of the vehicle's wheels is detected. After the isolation valves are closed in response to the detection of a lock-up condition, dump valves are actuated to reduce the brake fluid pressure being applied to the slave cylinders to reduce the braking torque being applied to the wheels. After the brake fluid pressure has been reduced to a value sufficient to terminate the lock-up condition, the isolation valves are periodically reopened until the lock-up condition is again detected. This cycle is repeated until the rotational speed of the wheels is below a predetermined value, the operator releases the braking force applied to the brake foot pedal or some other braking requirement is met.

Although the operation of this type of an antilock brake system is highly effective, the periodic opening and closing of the isolation and dump valves produces a pulsing feedback to the brake pedal during the antilock mode of operation which may be disconcerting to the operator.

The prior art teaches various ways to reduce or eliminate the pulsation of the brake pedal during the antilock mode of operation. Takata, in U.S. Pat. No. 4,892,362, teaches an antilock brake system having a differential pressure valve having a first state in which pressurized brake fluid is applied directly to the slave cylinder of the braking system, a second state in which the brake fluid pressure being applied to the slave cylinder is reduced as a function of the discharge capacity of a pump, and a third state in response to the closing of the dump valve in which the pressure applied to the slave cylinder is effectively the output pressure of the pump for a predetermined period of time after which the output of the master brake cylinder is applied directly to the slave cylinder of the brake assembly.

Other types of flow isolation valves are taught by Takata in U.S. Pat. No. 5,018,797, Bosch in German Patent No. 43 12 414, Hashida et al. in U.S. Pat. Nos. 4,964,680 and 5,026,123, and Kohno et al. in U.S. Pat. No. 5,094,512.

The invention is an antilocking brake system in which the isolation valve has a controlled fluid bypass in the normally closed state.

DISCLOSURE OF THE INVENTION

The object of the present invention is to reduce the feedback to the brake pedal during an antilock mode of operation of an antilock brake system by providing a permanent fluid bypass passageway in parallel with the isolation valve.

Another object of the invention is to provide the fluid bypass internal to the isolation valve of an antilock brake system.

A further object of the invention is an isolation valve having a fluid bypass passageway in parallel with the valve controlling a fluid flow in the isolation valve from an input fluid passageway to an output passageway.

Still another object of the invention is a switchable orifice isolation valve having a fluid bypass passageway permanently connecting the internal input and output fluid passageways of the valve.

The invention is an antilocking brake system having a master brake cylinder providing pressurized brake fluid to the brake assemblies of an automotive vehicle in response to the operator input. The brake system further includes an electronic control for providing antilock brake signals in response to the wheel speed signals generated by wheel speed sensors indicative of an actual or impending wheel lock-up condition. A normally open isolation valve is disposed between the master brake cylinder and the brake assembly and is closed in response to the antilock brake signals. A normally closed dump valve connected between the brake assembly and a low pressure accumulator is opened to reduce the pressure of the brake fluid being applied to the brake assembly in response to said antilock braking signals and a bypass passageway connected in parallel with the isolation valve to provide a continuous reduced fluid flow to the brake assembly when the isolation valve is closed in response to the antilock brake signals.

In the preferred embodiment, the bypass passageway is provided internal to the isolation valves.

These and other objects of the invention will become apparent from a reading of the specification in conjunction with the appended drawings.

BRIEF DESCRIPTION OF THE DRAWINGS

FIG. 1 is a block diagram illustrating the major components of the antilock brake system in accordance with the present invention;

FIG. 2 is a graph showing the profile of the brake fluid pressure being applied to the brake assembly during an antilock mode of operation of the system shown in FIG. 1;

BEST MODE FOR CARRYING OUT THE INVENTION

Figure 3:
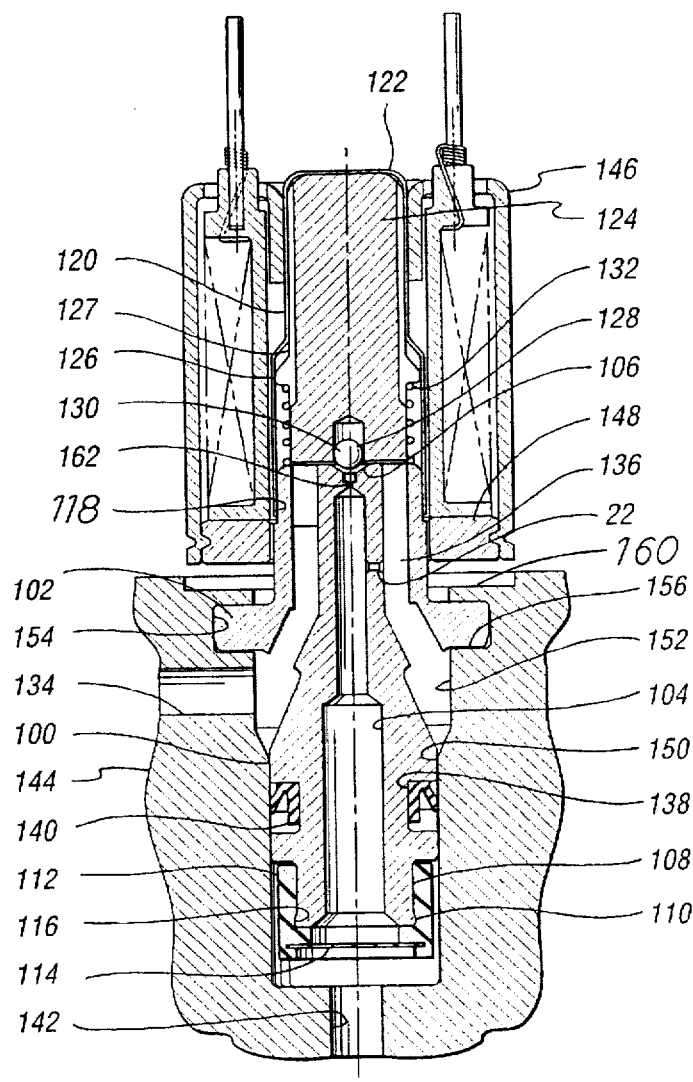
FIG. 3 is a cross-sectional view of an isolation valve embodying a bypass passageway in accordance with the present invention.

FIG. 1 is a schematic diagram of an antilock brake system 10 for an automotive vehicle having at least a front wheel brake assembly 12 and a rear wheel drum brake assembly 14 as is known in the art. The schematic diagram is for one-half of a brake system for a four wheel vehicle to simplify the drawing and the following description. As is known in the art, the vehicle will have a complementary brake circuit for the other two wheels of the vehicle.

The brake assemblies 12 and 14 each have a slave cylinder which are responsive to pressurized brake fluid to apply a braking torque to the associated wheel. A master brake cylinder 16 provides the pressurized brake fluid to the slave cylinders of brake assemblies 12 and 14 which is a function of the force applied to a brake pedal 18 by the operator of the vehicle. The pressurized brake fluid output from the master cylinder 16 is transmitted to the slave cylinder of brake assembly 12 through a solenoid actuated isolation valve 20. The isolation valve 20 has normally open full flow state and is switchable to a reduced flow state controlled by a bypass passageway 22 in accordance with the present invention. The output of the master cylinder 16 is also transmitted to the slave cylinder of the brake assembly 14 through an isolation valve 24. Isolation valve 24 also has a reduced flow state controlled by a bypass passageway 26 substantially identical to bypass passageway 22.

The output of the isolation valve 20 is also connected to the input to a normally closed dump valve 28 and the output of isolation valve 24 is connected to the input to a normally closed dump valve 30. The outputs of dump valves 28 and 30 are connected to each other, to a low pressure accumulator 32 and to the input to a pump 34. The output of pump 34 is connected to the inputs to isolation valves 20 and 24 through an attenuator 36.

The operation of the brake system 10, shown in FIG. 1, will be discussed relative to the brake fluid pressure curve 50 shown in FIG. 2. During normal braking, in the absence of a brake lock-up condition, the pressurized brake fluid from the master brake cylinder 16 produced in response to the force applied to the brake pedal 18 by the operator, is transmitted directly to each of the brake assemblies of the vehicle such as brake assemblies 12 and 14, through isolation valves 20 and 24, respectively, in their normally open state. In this mode of operation, the operator of the vehicle has direct control of the braking torque produced by the brake assemblies.

When a wheel lock-up condition of one or all of the wheels is detected by an electronic antilock brake control 38 in response to wheel speed signals received from wheel speed sensors 40 and 42, the isolation valves 20 and 24 respectively are activated to their reduced flow state to reduce the rate at which the brake fluid pressure being applied to brake assemblies 12 and 14 increases. Depending upon the antilock brake system, only the isolation valve 20 or 24 associated with the wheel experiencing lock-up may be activated or all of the isolation valves may be activated together.

The following discussion will be directed to the portion of the antilock brake system associated with the brake assembly 12. It is understood that the portion of the antilock brake system associated with the brake assemblies associated with the other two wheels of the vehicle operate in the same manner. The portions of the antilock brake system associated with brake assemblies 12 and 14 may be actuated independently or together as discussed above.

After the isolation valve 20 is switched to its reduced flow state by the electronic brake control 38, the dump valve 28 is activated to its open state for a predetermined period of time, causing the fluid pressure being applied to the brake assembly 12 to decrease rapidly as indicated by the portion 52 of the brake fluid pressure curve 50 shown in FIG. 2. The opening of the dump valve 28 permits a portion of the brake fluid between the isolation valve 20 and the brake assembly 12 to be transferred to the low pressure accumulator 32. The time the dump valve 28 is opened is controlled by the electronic brake control 38 and is selected to be a time sufficient for the brake pressure to be reduced to a pressure determined to eliminate the lock-up condition indicated as point 56 on pressure curve 50. Alternately, the dump valve 28 may remain open until the lock-up condition is terminated then closed. The pump 34 assures that the pressure of the brake fluid stored in the accumulator 32 is below a value less than the pressure determined to eliminate the lock-up condition.

After the preselected period of time, the isolation valve 20 is deactivated and it returns to its normally open state for a predetermined period of time, sufficient to cause the pressure being applied to the brake assembly to increase as indicated by segment 60 of the pressure curve 50. In the period of time between the closing of the dump valve 28 and the opening of the isolation valve 20, the pressure being applied to brake assembly 12 will increase as indicated by segment 58 of the brake fluid pressure curve 50 at a rate determined by the reduced brake fluid flow through the bypass passageway of the isolation valve 20.

Subsequently, the isolation valve 20 is periodically activated which causes the fluid pressure being applied to the brake assembly 12 to increase as indicated by segments 62 through 70 of the brake pressure curve 50 until a lock-up condition is again detected as indicated at point 72 of the brake pressure curve 50.

This process will be repeated until the pressure of the brake fluid produced by the master brake cylinder 16 is substantially equal to or less than the pressure being applied to the slave cylinder of the brake assembly 12 without causing a lock-up condition, such as when the operator releases the pressure applied to the foot pedal 18 or some other braking requirement is met.

The preferred embodiment of the isolation valve is shown in FIG. 3. Since the isolation valves 20 and 24 shown on FIG. 1 are substantially the same, the following discussion will be limited to isolation valve 20. The isolation valve 20 has a substantially cylindrical valve body 100 having a radial flange 102. The valve body 100 has a coaxial input passageway 104 provided therethrough which terminates at its upper end in a conical valve seat 106. The lower portion of the valve body 100 has a reduced diameter portion 108 which has an annular catch 110 adjacent to its lower end. A filter assembly 112, having a filter 114 is received over the reduced diameter portion 108 of the valve body 100. The filter assembly 112 has an annular recess 116 in which the annular catch 110 is received to snap lock the filter assembly 112 to the end of the valve body 100 with the filter 114 covering the lower end of the coaxial input passageway 104. The sleeve 120 has an open end and a closed end 122. The open end is laser welded to the valve body 100 providing a fluid tight seal therebetween. The valve body 100 has a reduced diameter section 118 over which the open end of the cylindrical sleeve 120 is received.

An armature 124 is slidably disposed in the cylindrical sleeve 120. The armature 124 has an annular flange 126 and an axial bore 128 in which is received a valve member 130 sized to engage the valve seat 106 and block the upper end of the coaxial input passage 104. The valve member 130 is preferably a ball made of steel or any other substantially non-deformable material. A coil spring 132 is disposed between the upper end of the valve body 100 and the flange 126 and resiliently biases the armature 124 away from the valve body 100 and the ball 130 away from the valve seat 106. As shown, the armature 124 and the flange 126 have through slots 127 providing a fluid passageway between the flange 126 and the closed end 122 of the cylindrical sleeve 120. The slots 127 prevent a fluid lock-up condition inhibiting the rapid displacement of the armature 124 relative to the valve body 100.

A solenoid coil assembly 146 is received over the cylindrical sleeve 120 and is operative, when energized, to produce a magnetic field displacing the armature 124 toward the valve body 100 causing the ball 130 to seat on the valve seat 106. The seating of the ball 130 on the valve seat 106 terminates the fluid flow between the axial input passage 104 and an output port 134 formed in the valve body housing 144 through internal output passageways 136 formed in the valve body 100.

The bypass passageway 22 is provided in the valve body 100 connecting the coaxial input passageway 104 and one of the output passageways 136. This bypass passageway 22 fluidically parallels the orifice 162 formed at the upper end of the coaxial input passageway 104 adjacent to the conical valve seat. The orifice 162 controls the fluid flow through the isolation valve in its inactivated state and its cross-sectional area is substantially larger than the cross-sectional area of the bypass passageway 22. In the preferred embodiment, the diameter of the orifice 162 may range from 0.75 mm to 1.0 mm (0.03 to 0.04 inches) and the diameter of the bypass passageway 22 is approximately 0.15 mm (0.006 inches).

The solenoid coil assembly may include an annular flux ring 148 disposed at the end adjacent to the valve body housing 144. The flux ring 148, such as taught in patent U.S. Pat. No. 5,439,279, issued on Sep. 8, 1995, and incorporated herein by reference, enhances the strength of the magnetic field acting on the armature 124 and reduces the current required to produce a magnetic field having a strength sufficient to displace the armature 124 against the force of spring 132.

The valve body 100 further has an annular groove 138 in which is received a one-way annular seal 140 to prevent a fluid flow from the internal inlet passageway 142 of the valve body housing 30 to the outlet passageway 134.

The valve body housing 144 has a valve cavity 150 for the isolation valve 20 to be mounted therein. The valve cavity 150 has an annular recess 152 provided adjacent to the terminal ends of outlet passageways 136 and a counterbore 154 in which is received the radial flange 102. Preferably, the diameter of the counterbore 154 is slightly smaller than the diameter of the radial flange 102, producing an interference fit in the radial sealing area between the radial flange 102 and the valve body housing 144.

To facilitate the insertion of the radial flange 102 into the counterbore 154, the leading edge of the radial flange 102 is tapered at approximately 15° to form a truncated cone. This truncated cone permits the radial flange 102 to be properly centered into the counterbore 154 and reduces the insertion forces required to seat the radial flange 102 on the shoulder 156 formed at the bottom of the counterbore 154 when the radial flange 102 is an interference fit.

After the radial flange 102 is seated on the shoulder 156 as shown in FIG. 3, the region of the valve body housing 144 adjacent to the edge of the counterbore 154 is swaged to form a lip 160 over the upper surface of the radial flange 102. This swaged lip 160 locks the valve body 100 in the valve bore 150 of the valve body housing 144 and produces an excellent fluid tight seal between the outer edge of the radial flange and the valve body housing 144.

Figure 4:
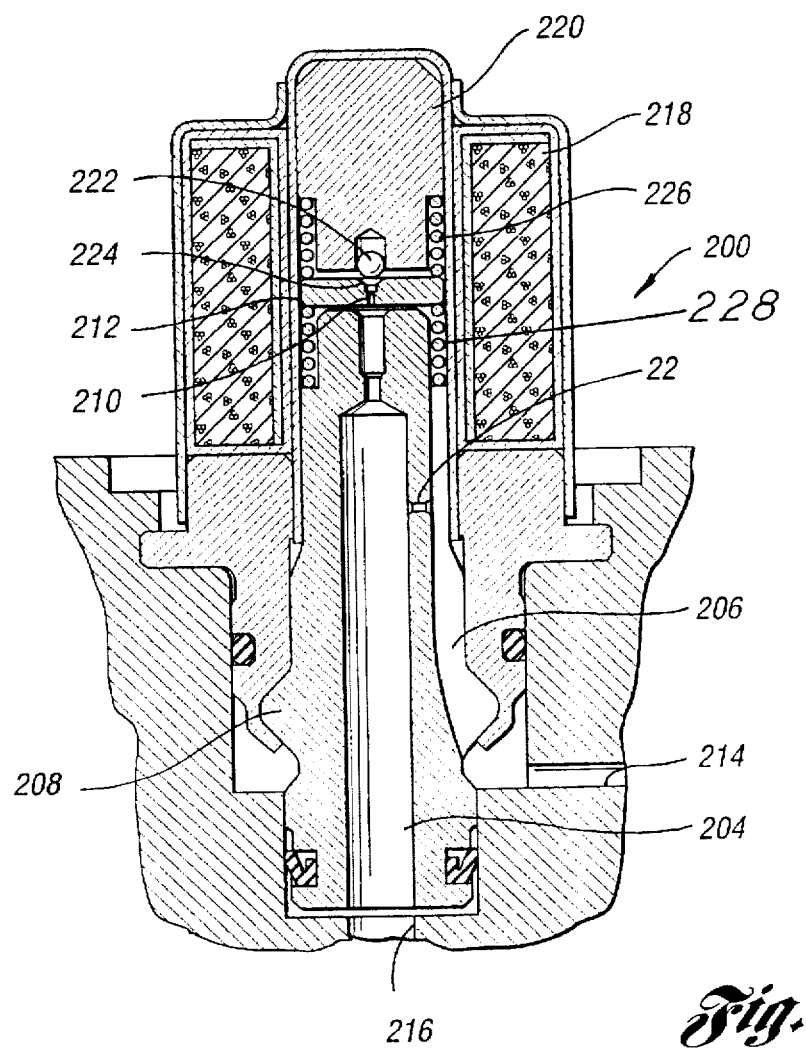
FIG. 4 is a cross-sectional view of a switchable orifice isolation valve embodying a bypass passageway in accordance with the present invention.

The bypass passageway 22 may also be provided in a switchable orifice isolation valve 200 of the type shown in FIG. 4 and described in detail in commonly assigned U.S. patent application Ser. No. 08/521,140, filed on Aug. 28, 1995, which is incorporated herein by reference. The bypass passageway 22 is disposed between the axial output passageway 204 and an offset input passageway 206 provided in the valve body 208. The diameter of the bypass passageway 22 is smaller than the diameter of a reapply orifice 210 provided in the displaceable disc 212.

Figure 5:
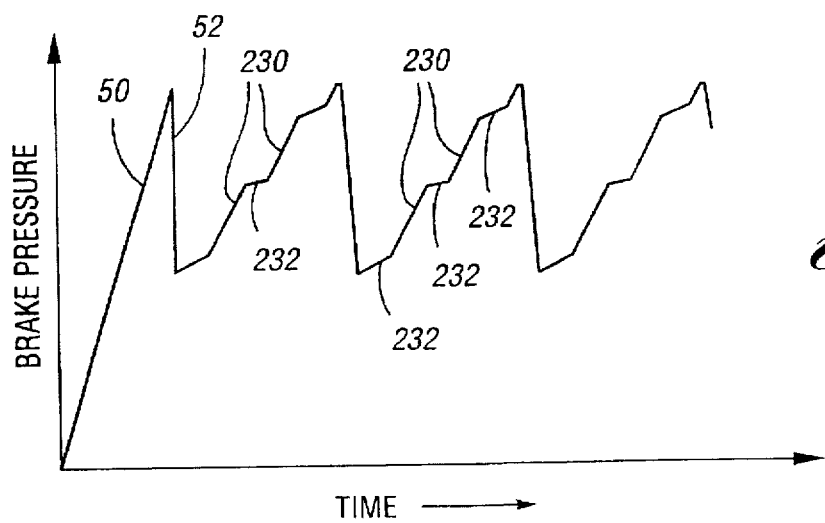
FIG. 5 is a graph showing the profile of the brake fluid pressure being applied to the brake assembly during an antilock mode of operation of a switchable orifice isolation valve as shown in FIG. 4.

In operation, the switchable orifice isolation valve 200 is in a normally open state with the disc 212 biased away from the top of the valve body 208 by a spring 228. In this state, fluid flows from the input port 214 to the outlet port 216 through the input passageway 206 through the space between the disc 212 and the top of the valve body 208 and out through axial output passageway 204. The valve 200 is closed when the solenoid 218 is energized displacing the armature 220 and the disc 212 into engagement with the top of the valve body 208 and the valve ball 222 engages a valve seat 224 provided at the end of the reapply orifice 210. In this state, fluid will flow from the input port 214 to the outlet port 216 through the bypass passageway 22. The armature 220 is displaced away from the disc 212 by spring 226 when the solenoid coil 218 is de-energized. Hydraulic pressure will hold the disc 212 against the top of the valve body 208 so that in the reapply state, fluid will flow from the input port 214 to the output port 216 through both the reapply orifice 210 and the bypass passageway 22. Therefore, the profile of the pressure being applied to the brake assembly as a function of time in the antilock mode of operation is as shown in FIG. 5. The rate of change of the brake pressure during the antilock mode of operation between the open state of switchable orifice isolation valve 200, indicated by segments 230 and closed state of the switchable orifice isolation valve 200 indicated by segments 232 is significantly reduced. This reduction in the rate of change of the pressure also reduces the amplitude of the feedback to the brake pedal during the antilock mode of operation.

Figure 6:
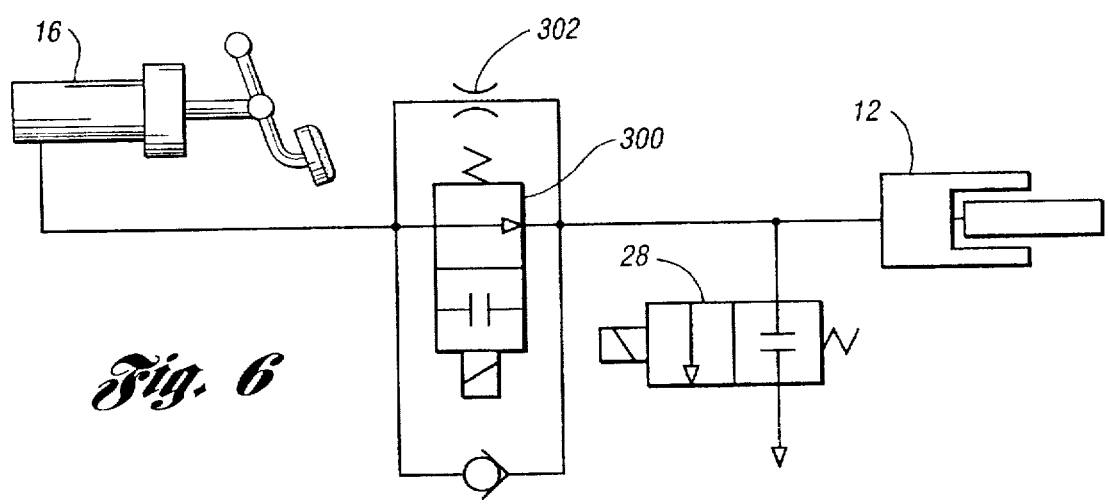
FIG. 6 is a partial block diagram of an antilock brake system in which the bypass passageway is provided external to the isolation valve in accordance with the present invention.

Alternatively, the bypass passageway may be provided external to the isolation valves 20 or 200 as shown in FIG. 6. The isolation valve 300 may be a conventional isolation valve or a switchable orifice isolation valve as disclosed in patent application Ser. No. 08/521,140, filed Aug. 28, 1995. The bypass passageway 302 is disposed in parallel with the isolation valve 300 between the master brake cylinder 16 and the brake assembly 12 or 14 and functions substantially the same as the bypass passageway 22 embodied in isolation valve 20 or switchable orifice valve 200 as discussed above.

While the best mode for carrying out the invention has been described in detail, those familiar with the art to which this invention relates will recognize various alternative designs and embodiments for practicing the invention as defined by the following claims.

What is claimed is:

1. An antilock brake system for an automotive vehicle comprising:

at least one brake assembly associated with at least one wheel of said automotive vehicle, said at least one brake assembly providing a braking torque to said at least one wheel in response to a pressurized brake fluid;

a master brake cylinder responsive to an operator input to provide said pressurized brake fluid to said at least one brake assembly;

a wheel speed sensor associated with each wheel of the vehicle for generating wheel speed signals;

an electronic control for generating antilock brake signals in response to said wheel speed signals indicating an impending wheel lock-up condition;

means for reducing the rate at which said pressurized brake fluid from said master brake cylinder is applied to said at least one brake assembly in response to said antilock signals, a low pressure accumulator;

a dump valve connected between said at least one brake assembly and said low pressure accumulator for reducing the brake fluid pressure being applied to said at least one brake assembly in response to said antilock brake signals to terminate said lock-up condition; and a pump connected between said low pressure accumulator and said master brake cylinder to assure the brake fluid pressure in said low pressure accumulator is below a value sufficient to terminate said lock-up condition;

wherein said means for reducing includes a switchable orifice isolation valve having an input passageway, an output passageway, a valve controlling a fluid flow between said input passageway and said output passageway, and a bypass passageway internal to said isolation valve connecting said input passageway to said output passageway in parallel with said valve, said valve having a normally open state providing a full flow fluid passageway between said input passageway and said output passageway and a closed state in response to said antilock signals prohibiting a fluid flow between said input passageway and said output passageway through said valve;

said switchable orifice isolation valve having a normally open state, a closed state, and a third state providing a reduced flow rate between said input passageway and said output passageway in response to the termination of said closed state, said switchable orifice isolation valve switchable between said closed state and said third state after an initial switching from said normally open state to said closed state:

said switchable orifice isolation valve includes a valve body;

an output fluid passageway axially disposed in said valve body;

an input fluid passageway provided in said valve body offset from said output passageway;

a full flow fluid orifice provided in said valve body to control the fluid flow between said input and output passageways when said switchable orifice isolation valve is in said open state;

a disc disposed adjacent to one end of said valve body, said disc having a reduced flow orifice axially aligned with said output fluid passageway, and a valve seat concentric with said reduced flow orifice on the side opposite said valve body;

a valve member coaxially aligned with said valve seat; and means for displacing said valve member to engage said valve seat and for displacing said disc into engagement with said valve body to block a fluid flow through said full flow fluid orifice and said reduced flow orifice;

wherein said bypass passageway connects said input fluid passageway to said output fluid passageway in parallel with said full flow fluid orifice.

2. The antilock brake system of claim 1 wherein said means for displacing comprises:

an armature disposed adjacent to said disc on the side opposite said valve body, said valve member being attached to said armature; and a solenoid coil circumscribing said armature, producing, when energized, a magnetic field sufficient to displace said armature in a direction engaging said valve member with said valve seat and said disc with said one end of said valve body.

3. The antilock brake system of claim 2 wherein a fluid flow through said reduced flow orifice produces a differential fluid pressure across said disc sufficient to maintain said disc engaged with said one end of the valve body when said valve member is disengaged from said valve seat in response to the solenoid coil being de-energized.

4. A switchable orifice isolation valve switchable between a full flow state and a reduced flow state comprising:

a valve body;

an input fluid passageway provided in said valve body;

an output fluid passageway provided in said valve body;

a valve disposed intermediate said input fluid passageway and said output fluid passageway, said valve having a closed state inhibiting a fluid flow from said input fluid passageway to said output fluid passageway and an open state connecting said input passageway to said output fluid passageway;

a bypass passageway connecting said input fluid passageway to said output fluid passageway in parallel with said valve a full flow orifice provided in said valve body controlling the fluid flow through said output fluid passageway;

a disc disposed adjacent one end of said valve body, said disc having a reduced flow orifice axially aligned with said output fluid passageway, and resiliently biased away from said one end of said valve body; and means for displacing said disc into contact with said one end of said valve body, causing a fluid flow from said input fluid passageway to said outlet fluid passageway to flow through said reduced flow orifice.

5. The isolation valve of claim 4 wherein said valve body has a full flow orifice which is closed by said valve in said closed state and controlling the fluid flow from said input passageway to said output passageway when said valve is in said open state and wherein said bypass passageway has a diameter less than the diameter of said full flow orifice.

6. The isolation valve of claim 5 wherein said bypass passageway has a diameter of approximately 0.15 millimeter.

7. The isolation valve of claim 4 wherein said solenoid actuated isolation valve further comprises:

a solenoid coil for generating a magnetic field;

a resiliently biased armature disposed adjacent to one end of said valve body, said armature displaceable toward said valve body in response to said magnetic field;

a valve seat provided in said valve body at an end of said output passageway adjacent to said armature; and a valve member attached to said armature coaxially aligned with said valve seat, said valve member operative to engage said valve seat in response to a displacement of said armature toward said valve body, said engagement of said valve member with said seat blocking a fluid flow from said input passageway to said output passageway.

8. The isolation valve of claim 4 wherein said means for displacing comprises:

a solenoid coil for generating a magnetic field;

an armature disposed adjacent to said disc and resiliently therefrom, said armature responsive to said magnetic field to displace said disc into contact with said one end of said valve body.

9. The isolation valve of claim 8 wherein said disc has a valve seat provided at an end of said reduced flow orifice adjacent to said armature; and said valve member is attached to said armature coaxially aligned with said valve seat, said valve member engageable with said valve seat and operative to displace said disc into engagement with said one end of said valve body in response to the displacement of said armature.

10. The isolation valve of claim 9 wherein said disc is hydraulically held against said one end of said valve body when a pressurized fluid is being applied to said input passageway and said armature is displaced from said disc.

* * * * *